United States Patent [19]

Silvester

[11] 4,275,612

[45] Jun. 30, 1981

[54] SHIFT CONTROL FOR CHANGE SPEED GEAR TRANSMISSION FOR VEHICLE

[75] Inventor: Robert C. Silvester, Fleet, England

[73] Assignee: Eaton Corporation, Cleveland, Ohio

[21] Appl. No.: 970,052

[22] Filed: Dec. 15, 1978

[30] Foreign Application Priority Data

Mar. 30, 1978 [GB] United Kingdom ............. 12419/78

[51] Int. Cl.³ ..................... G05G 9/12; G05G 5/00
[52] U.S. Cl. .................... 74/473 R; 74/475;
74/745; 74/850
[58] Field of Search ............. 74/740, 745, 473 R,
74/475, 850

[56] References Cited

U.S. PATENT DOCUMENTS

| 2,932,988 | 4/1960 | Flynn et al. | 74/745 |
| 3,229,551 | 1/1966 | Stuckey | 74/745 |
| 3,498,155 | 3/1970 | Ivanchich et al. | 74/745 |

FOREIGN PATENT DOCUMENTS 1195177 6/1965 Fed. Rep. of Germany ............. 74/745

Primary Examiner—Allan D. Herrmann
Attorney, Agent, or Firm—R. J. McCloskey; H. D. Gordon

[57] ABSTRACT

A shift control for a compound change speed gear transmission of the range type which provides two separate sets of shift paths (A and B), one for each range of the auxiliary transmission, and individual positions in each shift path for selection of individual ratios in the main transmission. The control comprises at least two parallel axially slidable shift rods (11, 12 and 13) and a transverse cross shaft (14) which is axially and rotationally movable. Each shift rod (11 and 12) defines at least two axially spaced pairs of faces (16a, 16b, 17a and 17b) which pairs are axially spaced apart for selective engagement by a selector finger (15) carried by the cross shaft. At least one of the pairs of faces (16a, 16b, 17a and 17b) on each shift rod is disposed between the pairs of faces carried by the other shift rod. A switch (25) is operable to shift the auxiliary transmission as a result of movement from one shift path to the other shift path and a resilient detent (62) is provided to inform the operator when a change in shift path is attempted.

16 Claims, 10 Drawing Figures

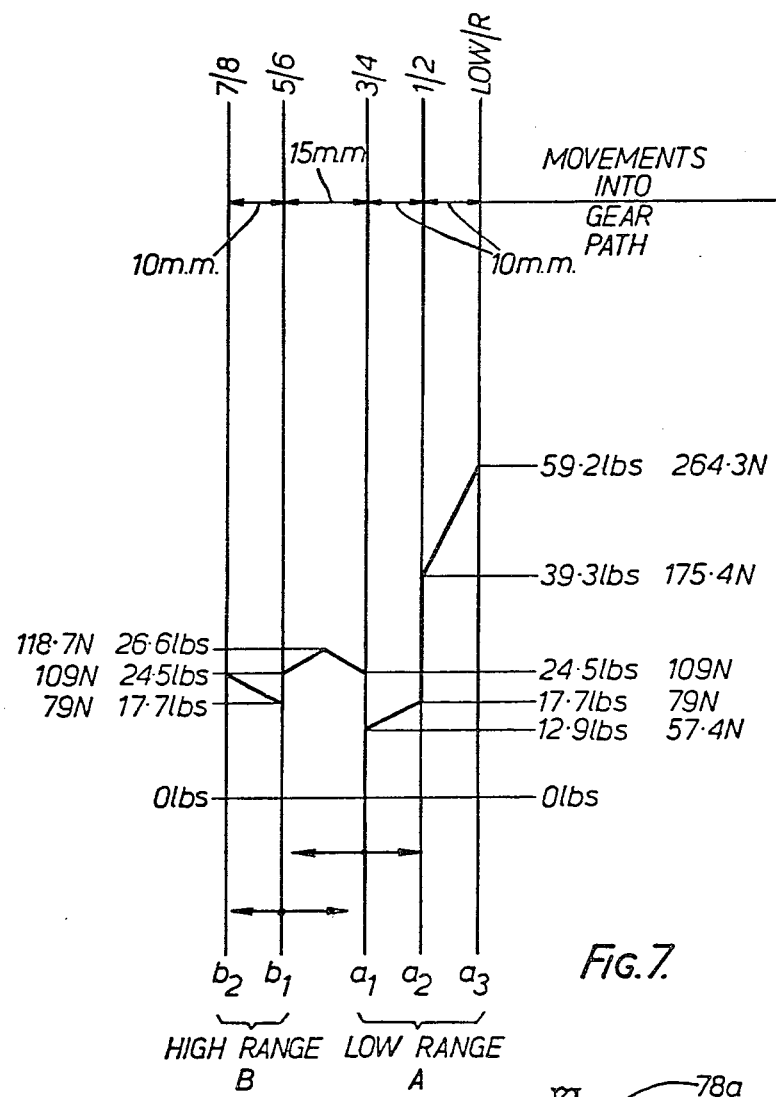

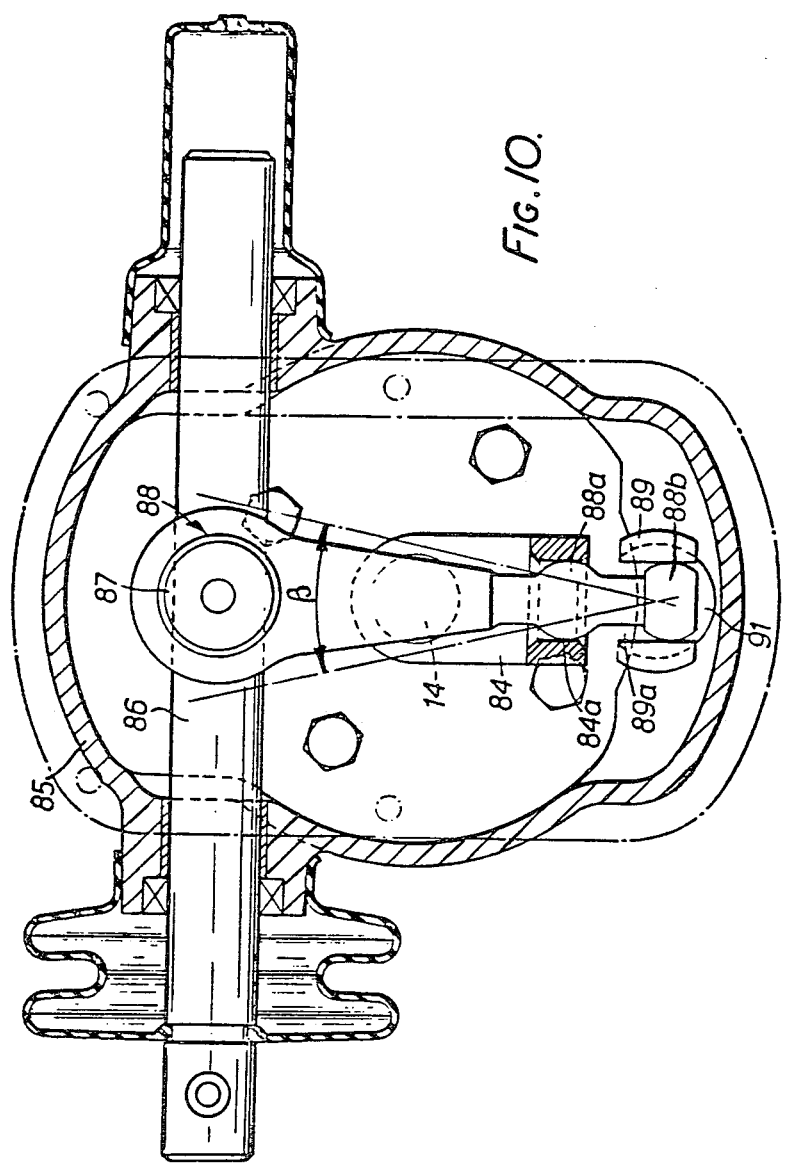

SHIFT CONTROL FOR CHANGE SPEED GEAR TRANSMISSION FOR VEHICLE

BACKGROUND OF THE INVENTION

The present invention involves a shift control for change speed gear transmissions for vehicles or the like and in particular concerns a shift control for change speed gear transmissions of the type comprising a main transmission section having a plurality of gear ratios shiftable by means of a gear change lever and a two-ratio auxiliary transmission section connected in series with the main transmission section and shiftable in response to fluid pressure signals to select either one of two alternative sets, or ranges, of vehicle drive ratios from which individual vehicle drive ratios are selected by shifting of the gear change lever. Such transmissions are commonly referred to as compound transmissions of the range type.

SUMMARY OF THE INVENTION

According to the present invention, a shift control for compound change speed gear transmission of the range type comprises a casing, at least two parallel shift rods each shiftable axially in the casing to select a gear ratio or gear ratios of the main transmission section, a cross shaft mounted in said casing, transversely of said shift rods, for axial sliding movement to and fro in the direction of its longitudinal axis and for rotational movement in both directions about its longitudinal axis, a gear selector finger on the cross shaft and movable therewith, selector finger engagement faces on the shift rods engageable by said gear selector finger to shift the shift rods, there being at least two selector finger engagement faces on each shift rod which are spaced apart in the direction of axial sliding movement of the cross shaft with one selector finger engagement face on each shift rod disposed between the selector finger engagement faces on the other shift rod, and switch means operable in response to axial sliding of the cross shaft between its axial positions to engage said gear selector finger with said one of said selector finger engagement faces on one shift rod and said one of said selector finger engagement faces on the other shift rod, for shifting the auxiliary transmission section. With a shift control in accordance with the present invention, as defined in the immediately preceding paragraph, a gear change lever connected to operate the cross shaft is displaceable between second and third shift paths in which the gear selector finger is positioned to engage said one of said selector finger engagement faces on said one of said shift rods and said one of said selector finger engagement faces on the other of said shift rods to shift the main transmission, thereby to shift the auxiliary transmission, and the lever is additionally displaceable out of the second and third shift paths into first and fourth shift paths respectively in which the gear selector finger is positioned to engage respectively with the other of the selector finger engagement faces on said one shift rod and said other shift rod without shifting the auxiliary transmission. Thus, the gear change lever has two sets of shift paths to select vehicle drive ratios from the two sections of the auxiliary transmission respectively within each of which the lever is movable to an individual position to select each individual vehicle drive ratio in each range of the auxiliary. Shift controls of this type are commonly referred to as "double H" shift controls. Furthermore, the gear change lever may be connected to operate the cross shaft at any convenient remote location. Preferably, two pairs of selector finger engagement faces are provided on each shift rod, the faces of each pair being spaced apart in the direction of axial shifting of the shift rods, and the selector finger is displaceable in the direction of the longitudinal axis of the cross shaft to engage between each pair of selector finger engagement faces.

The shift control may further comprise a third shift rod disposed parallel with said two parallel shift rods and shiftable axially to select a further gear ratio or gear ratios of the main transmission, there being a selector finger engagement face on the third shift rod engageable by said gear selector finger to shift the third shift rod, and positioned to one side of the selector finger engagement faces on said two parallel shift rods in the direction of axial sliding movement of the cross shaft.

The shift control may still further comprise a formation on the cross shaft movable therewith to engage and overcome a spring urged detent mounted on said casing each time the cross shaft is slid axially in either direction to operate said switch means, and a pair of resiliently yieldable abutments carried by the casing, one on each side of said detent, for positioning said formation in engagement with said detent when the formation is disposed between the abutment and the detent.

The abutments act to urge the gear change lever into a neutral position in a predetermined shift path in each set of shift paths whenever the gear change lever is moved into a neutral position. Thus, the abutments ensure that the gear change lever is moved always into the same position ready for shifting the auxiliary transmission to select high range and low range respectively. Furthermore, the action of overcoming the detent when operating said switch means to shift from one range to the other, indicates to the driver of the vehicle that this shift is being performed and prevents the shift from one set of shift paths to the other being made inadvertently.

Accordingly, it is an object of the present invention to provide an improved shift control for change speed gear transmission of the kind described in which the gear change lever is displaceable between two sets of shift paths to select vehicle drive ratios from the two ranges of the auxiliary transmission respectively and to an individual position in each set of shift paths to select the individual vehicle drive ratio in each range of the auxiliary transmission.

These and other advantages and objects of the present invention will become apparent from a reading of the detailed description of the preferred embodiments taken in connection with the attached drawings.

BRIEF DESCRIPTION OF THE DRAWINGS

FIG. 7 is a diagram of the shift paths of a manual gear change lever associated with the shift control and showing the forces required to be applied to the gear change lever to achieve each gear selection setting;

FIG. 8 is a partial view of the shift control in a somewhat diagrammatic form and showing further details of its construction;

FIG. 10 is a view in the direction of arrow 10 in FIG. 9.

DESCRIPTION OF THE PREFERRED EMBODIMENT

With reference now to the accompanying drawings, and first with reference to FIGS. 1 to 8, the shift control of the present invention is for a compound range type transmission comprising a main transmission section (not shown) having four, normal forward drive gear ratios, a low or crawl forward drive gear ratio and a reverse drive ratio, shiftable by means of a manual gear change lever (not shown) and a two-ratio auxiliary transmission section (not shown) having a low range and a high range which auxiliary transmission is shiftable in response to fluid pressure signals to modify the vehicle drive ratios obtained by selection of the four, normal forward drive gear ratios of the transmission section, respectively.

The shift control comprises a casing comprising a control housing 10 and a shift rod housing 10 which houses three parallel shift rods 11, 12 and 13 (see FIG. 1), disposed in a common horizontal plane. The shift rods are mounted for axial sliding movement and each shift rod is shiftable axially in the housing 10 in opposite directions from a neutral position, to select either one of two gear ratios of the main transmission section. A cross shaft 14, mounted in the control housing 10, extends transversely of the shift rods 11, 12 and 13, above the shift rods, with its longitudinal axis disposed normal to the longitudinal axes of the shift rods. The cross shaft 14 is slidable axially in its housing, to and fro in the direction of its longitudinal axis, and the cross shaft 14 is also rotatable about its longitudinal axis in both directions.

Figure 3:
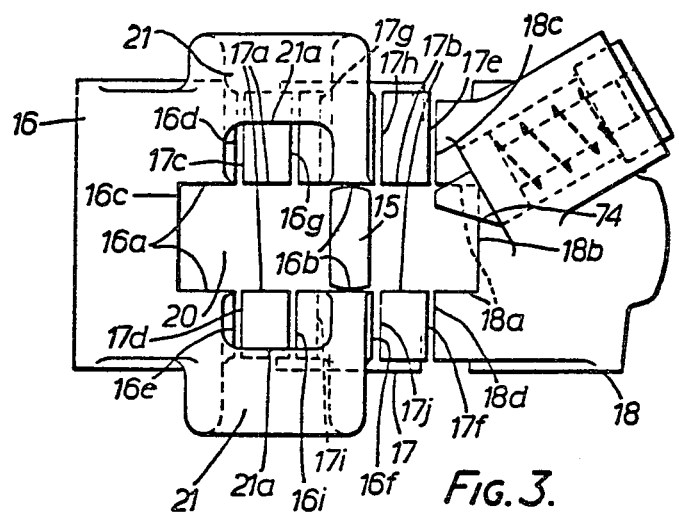
FIG. 3 is a view in the direction of arrow 2 in FIG. 1 showing parts of the shift control not shown in FIG. 2.

A gear selector finger 15 is fixed on the cross shaft 14, immediately above the shift rods 11, 12 and 13, so as to be movable with the cross shaft both axially in the direction of its longitudinal axis and angularly in both directions about its longitudinal axis. Shift rods 11, 12 and 13 each carry a selector block, 16, 17 or 18, respectively, which are arranged side by side, as best shown in FIG. 3 when the shift rods are all in their neutral positions. The selector blocks 16 and 17 on the shift rods 11 and 12 respectively each present two pairs of opposed selector finger engagement faces 16a and 16b and 17a and 17b respectively (see FIG. 3), the faces of each pair of which are spaced apart in the direction of axial shifting of the shift rods, while the pairs of faces themselves are spaced apart in the direction of axial sliding movement of the cross shaft. The selector block 18 on the shift rod 13 presents a single pair of opposed selector finger engagement faces 18a (see also FIG. 3). The pairs of faces 16a, 16b, 17a, 17b and 18a together define a slot 20, when the shift rods are all in their neutral positions, in which the lower distal end of the selector finger 15 is accommodated. The selector finger is displaceable to and fro along the slot 20 between slot end faces 16c and 18b formed on the selector blocks 16 and 18 respectively, in the direction of the longitudinal axis of the cross shaft with axial sliding movement of the cross shaft, to engage between each pair of the selector finger engagement faces, to shift the shift rod associated with the faces in one or other direction upon rotational movement of the cross shaft about its longitudinal axis. The selector blocks 16 and 17 themselves are each formed with two slots intersecting at right angles, the slots extending parallel with the longitudinal axis of the cross shaft and the longitudinal axes of the shift rods respectively. The selector block 17 has a resulting castellated form while the selector block 16 has the form of a two-fingered claw the fingers 21 of which extend into the longitudinally extending slot in the selector block 17 at their distal ends. The transverse slots in the selector blocks 16 and 17 align to define the slot 20 in part. As a result of this configuration of the selector blocks 16 and 17, one pair of selector finger engagement faces 16b on the selector block 16 is disposed between the two pairs of selector finger engagement faces 17a and 17b on the selector block 17 and one pair of selector finger engagement faces 17a on the selector block 17 is disposed between the two pairs of selector finger engagement faces 16a and 16b on the selector block 16.

To allow for axial shifting of the shift rod 12 by the selector finger 15 when engaging one or the other of the faces 17a, the fingers 21 of the selector block 16 are recessed, as at 21a (see FIG. 3) at their adjacent sides. A switch means, generally indicated at 25 (see FIG. 2) is provided which is operable in response to axial sliding of the cross shaft 14 between its positions to engage the finger 15 with the faces 16b and 17a for shifting the auxiliary transmission. The switch means comprises a mechanically operable, spring biased, two position air valve 26 connected in a compressed air circuit diagrammatically illustrated in FIG. 5 to supply air under pressure to alternative sides of a servo piston and cylinder assemblage 27 for shifting the auxiliary transmission between its high and low ranges respectively. The valve has an operating tappet 30 which is urged to an extended position seen in FIGS. 2 and 5 by the valve spring 35 (see FIG. 5) in the path of a ramp 36 formed on one side of the selector finger 15. The ramp 36 engages the tappet 30 to operate the valve 26 to select high range when the selector finger 15 is moved from a position to the right of the faces 17a in FIG. 3, between the faces 17a or the faces 16a. The air circuit additionally comprises a filter 37 and an air pressure regulator 38.

Figure 4:
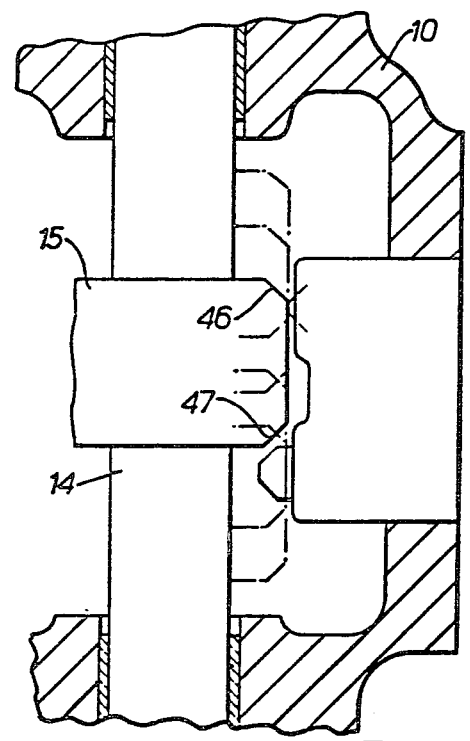
FIG. 4 is a partial view corresponding to FIG. 2 and showing a modification.
Figure 5:
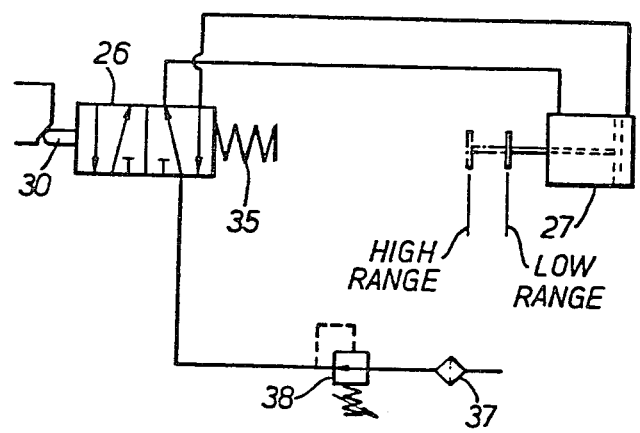
FIGS. 5 and 6 are air diagrams.
Figure 6:
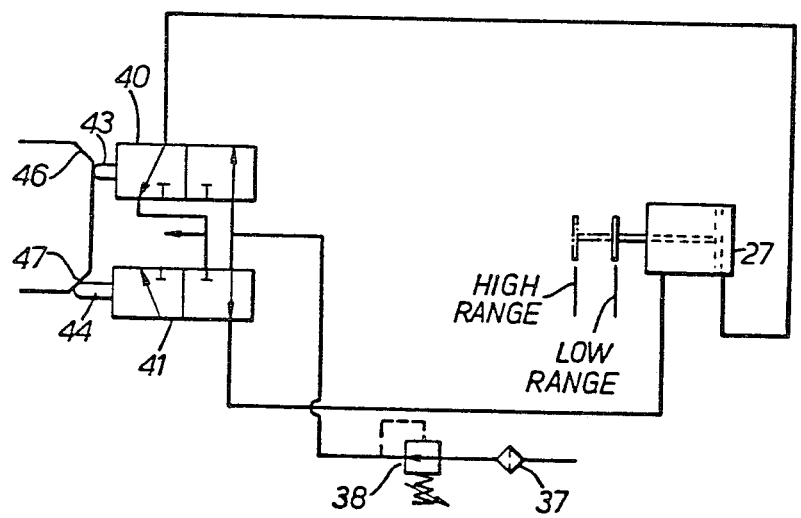

FIGS. 4 and 6 illustrate an alternative arrangement for operating the piston and cylinder assemblage 27 employing two mechanically operable, spring pressed changeover valves 40 and 41 having operating tappets 43 and 44 respectively arranged for engagement with a pair of ramps 46 and 47 respectively formed on one side of the selector finger 15. The valve 40 is operated by the ramp 46 to exhaust one side of the piston and cylinder assemblage 27 as the ramp 47 disengages the valve 41 thereby to allow the valve 41 to be adjusted by its valve spring to supply air under pressure to the other side of the piston and cylinder assemblage, and vice versa, to shift the group transmission into low range and high range respectively as the finger 15 is moved to the right of the faces 17a in FIG. 3 and back again to a position between those faces or the faces 16a.

Figure 1:
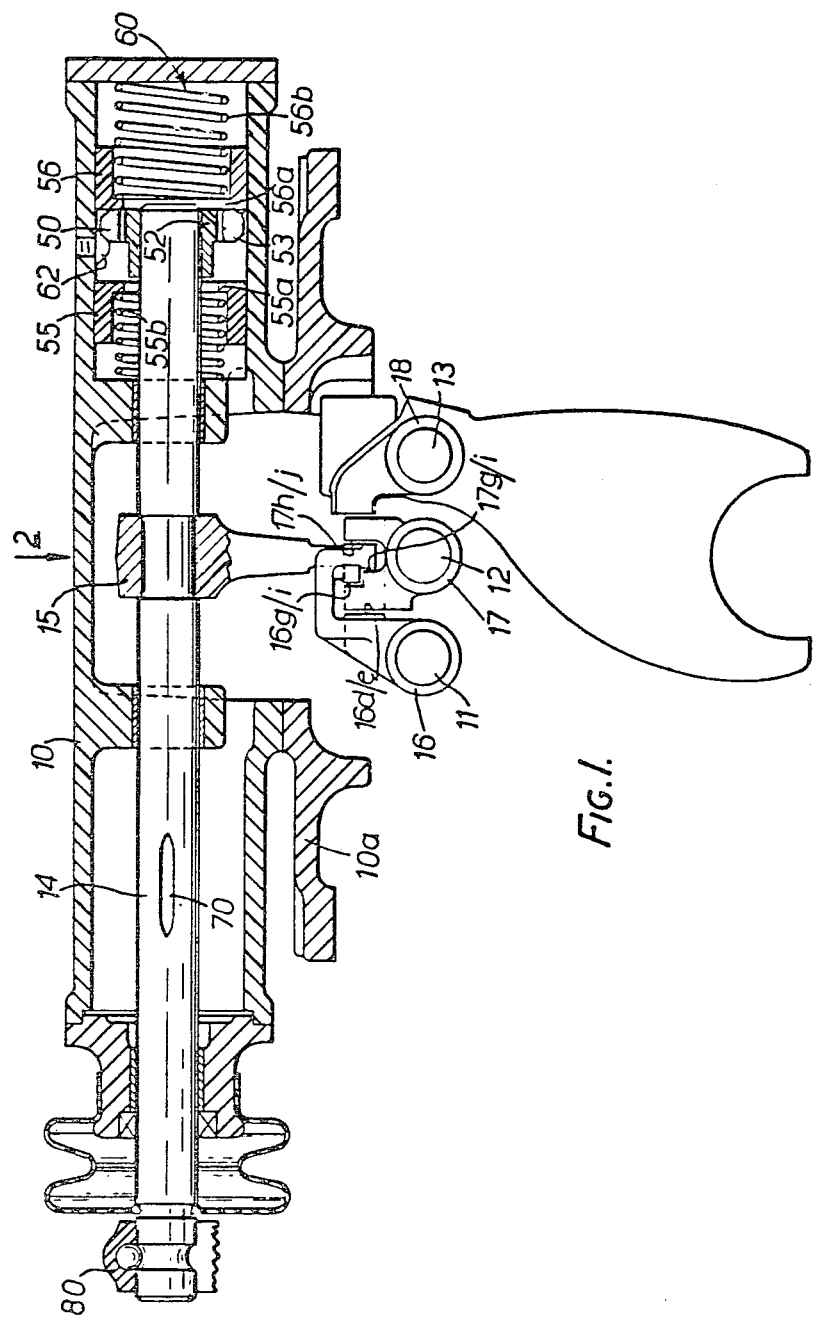
FIG. 1 is a cross-sectional view of a shift control for change speed gear transmission in accordance with the present invention.
Figure 2:
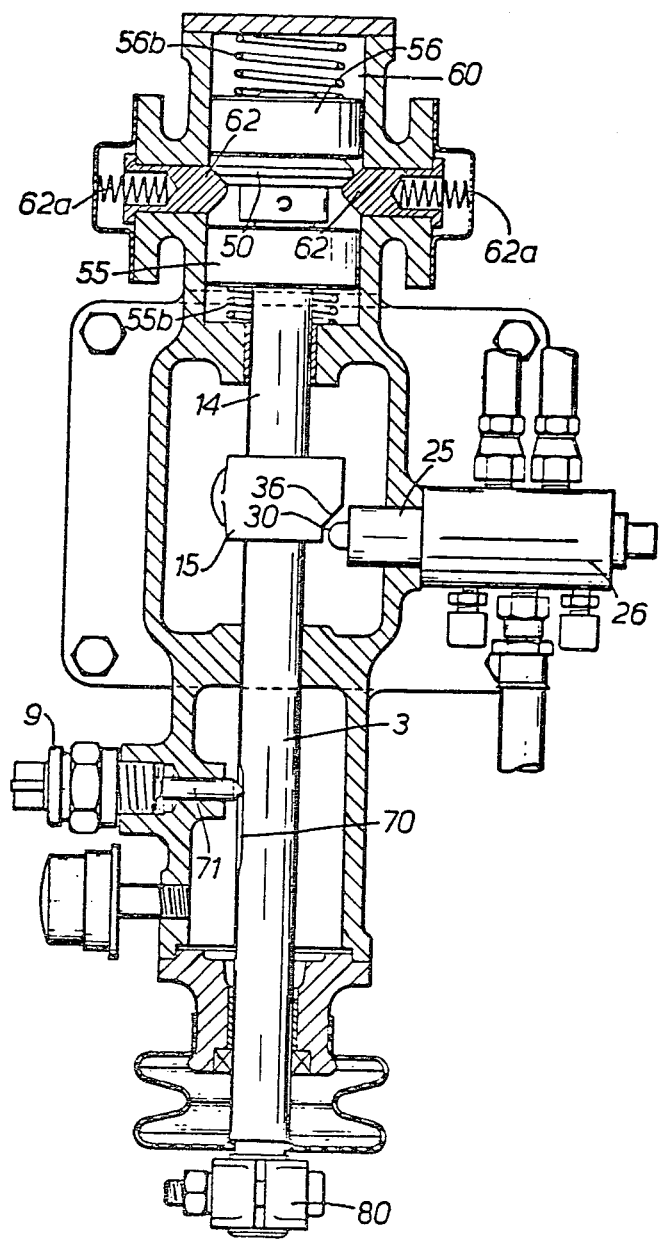
FIG. 2 is a view, partly in cross-section, in the direction of arrow 2 in FIG. 1.

The cross shaft 14 carries, at one end, a fixed collar 50 having a peripheral flange formation 52 bevelled, as at 53, on its opposite side faces. The formation 52 is disposed between a pair of resiliently yieldable abutments 55 and 56 mounted at opposite ends of a hollow cylindrical space or cylinder 60 formed in the housing 10. Each abutment comprises an internally shouldered sleeve 55a or 56a slidable in the cylinder 60 and a coiled compression spring 55b or 56b engaged between the shoulder of the sleeve and the adjacent end wall of the cylinder. A pair of spring urged detents 62 are mounted in the housing 10 so as to project into the cylinder 60 in the path of movement of the flange formation 52. In FIG. 1, the formation 52 is positioned to the right hand side of the detents 62 and is held against the detents without nevertheless any tendency to overcome them, by the spring abutment 56. The selector finger 15 is then positioned between the faces 16b and the auxiliary transmission is in low range. When force is applied to the cross shaft 14 to displace the cross shaft to the left to position the finger 15 between the faces 17a, thus shifting the auxiliary transmission into high range, the formation 52 has to ride over the detents 62, forcing them back against the action of their springs 62a (see FIG. 2) by camming action between the bevelled face 53 on the left hand side of the formation 52 in FIG. 1 and the detents 62, which are of conical shape as shown. Thereafter, and in the same way, when a force is applied to the cross shaft 14 to displace the cross shaft to the right in FIG. 1, so that it reassumes its position as shown in FIG. 1, the bevelled face 53 on the right hand side of the formation 52 in FIG. 1 engages and forces back the detents 62, and the group transmission is shifted into low range.

When the finger 15 is positioned between the faces 17a, the formation 52 is held against the left hand side of the detents 62 in FIG. 1 by the spring abutment 55, without nevertheless overcoming the detents.

Displacement of the cross shaft 14 to carry the formation 52 away from the detents 62 on either side, is accompanied by compression of the spring 55b or 56b.

The limiting positions are reached when the selector finger 15 engages the faces 16c and 18b, respectively.

The cross shaft 14 has an axial groove 70 which aligns with a spring pressed, electrical switch operating detent 71 carried by the housing 10 in the neutral rotational position of the cross shaft and with the shaft in an axial position to select low range in the auxiliary transmission. In this position, the shift rods 11, 12 and 13 are all in a neutral position. The detent 71 is displaceable to open a pair of contacts in the engine starter circuit to prevent the engine being started except when the gear box is in neutral in the main transmission and in low range in the group transmission. A spring pressed detent 74 is mounted on the selector block 18 to resist the entry of the selector finger 15 between the faces 18a.

Further spring pressed detent balls such as 78 (see FIG. 8) are provided in the shift rod housing 10A to engage in one of three axially spaced circumferential grooves 80a, 80b, or 80c in each shift rod 11, 12 and 13 to locate the shift rods in the neutral position and in their gear selecting positions respectively. The detent springs 78A determine the force required to be applied to the selector finger 15 by rotational gear selection movements of the cross shaft 14 to shift the main transmission.

Any known or convenient shift rod interlock is provided to prevent simultaneous selection of two gears in the main transmission due to malfunctioning of the change speed mechanism. This may act to ensure that two of the shift rods are always locked in the neutral position whenever the third is displaced out of its neutral position. A manual gear change lever (not shown), is connected to operate the cross shaft 14 via an operating lever 80. The manual gear change lever is shiftable in two sets of shift paths A and B in FIG. 7 to engage the finger 15 between the faces 16b, 17b and 18a and between the faces 16a and 17a, respectively. In the first set of shift paths A the group transmission is in low range and in the second set of shift paths B the group transmission is in high range. The forces required to shift the manual lever between the various shift paths against the action of the springs 55b and 56b and the spring pressed detents 62 and 74 are indicated along the vertical axis in the diagram of FIG. 7. In the first set of shift paths A, the manual gear change lever is urged, when in a neutral position, by the spring 56b into the path $a_1$ in which the finger 15 is positioned between the faces 16b and the gear change lever may then be moved forwardly or rearwardly to select third or fourth gear respectively having overcome the force of the spring 78A associated with the shift rod 11.

The manual gear change lever may be shifted transversely into the shift path $a_2$ in the first set of shift paths A against the action of the spring 56b. This positions the finger 15 10 mm to the right, as shown in the diagram of FIG. 7, between the faces 17b and the manual gear change lever may then be shifted forwardly or rearwardly to select first or second gear respectively against the force of the spring 78A associated with the shift rod 12.

The manual gear change lever may again be shifted transversely into the shift path $a_3$ in the first set of shift paths A, against the action of the spring 56b and the spring pressed detent 74 to position the finger a further 10 mm to the right between the faces 18a, and then forwardly or rearwardly to select low or reverse gear, respectively.

Whenever the manual gear change lever is shifted out of gear in the set of shift paths A, it is returned to a neutral position in the shift path $a_1$ by the spring 56b.

The manual gear change lever may be shifted transversely into the second set of shift paths B, out of the last mentioned position, against the action of the detents 62. When neutrally positioned in the set of shift paths B, the manual gear change lever is urged into the shift path $b_1$ by the spring 55b. The finger 15 is positioned between the faces 17a 15 mm to the left of its position in shift path $a_1$ and the manual gear change lever may be shifted forwardly or rearwardly to select fifth or sixth gear respectively. The manual gear change lever may be shifted transversely into the shift path $b_2$ against the action of the spring 55b, to position the finger 15 a further 10 mm to the left, and then either forwardly or rearwardly to select either seventh or eighth gear.

Whenever the manual gear change lever is shifted out of gear in the set of shift paths B, it is returned to a neutral position in the shift path $b_1$ by the spring 55b.

In its gear selecting positions for seventh and eighth gears and low and reverse gears, the finger 15 is restrained in the longitudinal direction of the cross shaft 14 between opposed faces of adjacent selector blocks 16 and/or 17 and 18, respectively, and is therefore locked in position between the opposed selector finger engagement faces of the individual blocks. In particular, when the finger 15 is in its position selecting seventh gear, it is restrained between the opposed faces 16c and 17c on the selector blocks 16 and 17 respectively. When the finger 15 is in its position selecting eighth gear, it is restrained between the opposed faces 16c and 17d on the selector blocks 16 and 17, respectively. When the finger is in its positions selecting low gear and reverse gear respectively, the finger 15 is locked in position by the faces 18b and 17e and 18b and 17f.

In the gear selecting positions for the first and second gears, the finger 15 is retrained in the longitudinal direction of the cross shaft 14 between opposed faces of the spaced selector blocks 16 and 18. These opposed faces are indicated 16e, 18c and 16f, 18d, respectively.

In the gear selecting positions for the third to the sixth gears inclusive, the finger 15 is restrained in the longitudinal direction of the cross shaft between opposed faces of the selector blocks 17 and 16 respectively, one of which is a stepped face. These faces are indicated as follows: for the third gear at 17g and 17h; for the fourth gear at 17i and 17j; for the fifth gear at 16d and 16g; and for the sixth gear at 16i and 16e.

The increased axial shifting distance of the shaft and finger 15 to change the group transmission allows sufficient room for the collar 50 to ride past the detents 62 in either direction.

In a modification, illustrated in FIGS. 9 and 10, to which reference will now be made, parts corresponding with parts already described with reference to FIGS. 1 to 8 are indicated by the same reference numerals as previously used and will not be further described.

The cross shaft 14 carries a relay lever 84, in substitution for the lever 80 previously described, welded thereto. The end cap shown in FIG. 1 at the left hand side, adjacent the lever 80, is replaced by an outer housing 85 which journals a fore- and aft selector shaft 86.

A trunnion 87 is secured to the shaft 86. Suspended from the trunnion is a double balled drop lever 88 the upper ball 88a of which is located in a hole 84a in the relay lever 84 and the lower ball 88b of which is located in a slot 89a of a fork 89 mounted from a cover plate 90 of the housing 85 and supported at its opposite, inner end in a hole 91 in the housing 85. The fork slot 89a remains open at its inner end for the purpose of assembling the ball 88b in the slot, the slot being closed by the housing 85 when the fork is inserted in the hole 91 and the cover plate 90 fixed to the housing.

The manual gear change lever is again not shown but is connected to the shaft 86 so as to be operable to rotate the shaft 86 and to displace the shaft axially in opposite directions. Axial displacement of the shaft 86 is relayed by the relay lever 84 to rotate the cross shaft 14 and rotational movement of the shaft 86 is relayed by the relay lever 84 to shift the cross shaft 14 axially.

Figure 9:
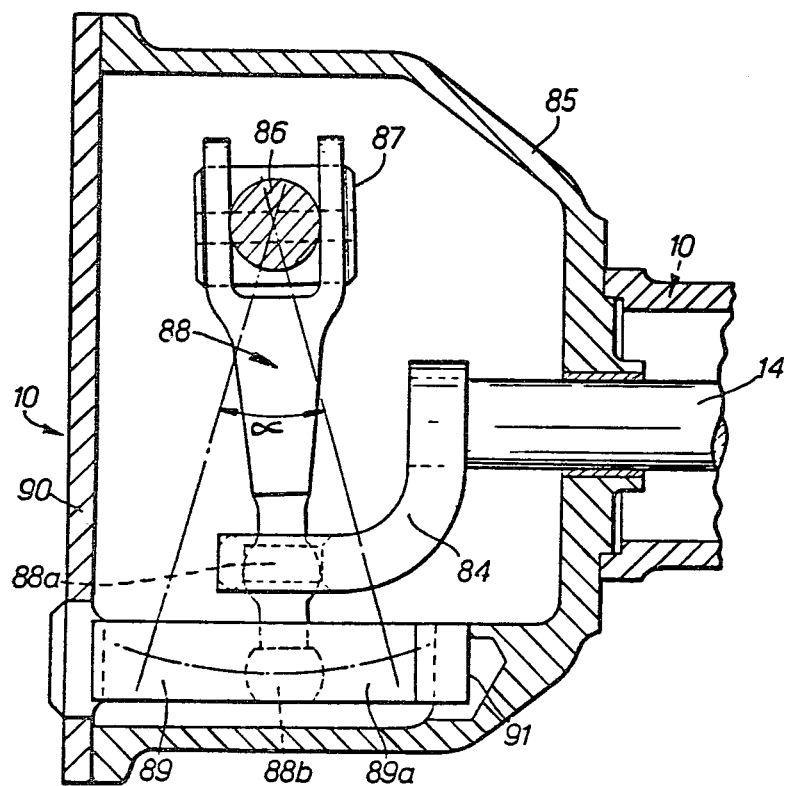
FIG. 9 is a partial view corresponding with the left hand end of FIG. 1 and showing a modification.

Rotation of the shaft 86 rotates the trunnion 87 which in turn swings the drop lever 88 through the angle indicated in FIG. 9, the lever 88 then being guided by the fork slot 89a cooperating with the lower ball 88b of the lever. The lesser arcuate movement of the upper ball 88a, located in the hole 84a in the relay lever displaces the relay lever bodily leftwards or rightwards in FIG. 9 to shift the cross shaft 14 axially. Axial displacement of the shaft 86 causes the drop lever 88 to swing about the center of the trunnion 87 through the angle B indicated in FIG. 10 and the lower ball 88b up or down in the fork slot 89a. At the same time the upper ball 88a is arcuately displaced, thereby swinging the relay lever about the center of the cross shaft 14 to rotate the cross shaft.

A special feature of the alternative interconnection of the manual gear change lever described with reference to FIGS. 9 and 10 is the extra travel of the lever which is required to move the selector shaft 86 axially to select a gear. This extra movement of the gear change lever may be designed to absorb any movement of the vehicle cab relative to the change speed gear transmission which could be transferred through a cab mounted gear change lever to cause the transmission to jump out of gear. The mounting arrangements for a manual gear change lever described are intended for left hand drive vehicles, the gear change lever being mounted at the left hand side in FIG. 1. However, the arrangements are readily adapted for right hand drive with a minimum of alternative parts. In the shift control described with reference to the drawings, the manual gear change lever is the sole manual control for gear shifting. The manual lever has a unique position to select each vehicle drive ratio and is always returned to a predetermined pre-shift position, in neutral, in each of two sets of shift paths individual to high and low range respectively ready for shifting into the alternative range. A pronounced force is required to shift the manual gear change lever between the two sets of shift paths (i.e., between ranges), so that such a shift is not readily achieved inadvertently by the driver. Shifting of the manual gear change lever within each set of shift paths out of neutral into each selected gear and out of each selected gear into neutral requires a predetermined force application to the manual lever by the driver and shifting into each selected gear and out of each selected gear into neutral requires a predetermined force application to the manual lever by the driver and shifting into each selected gear and the return of the lever to neutral is, in each case, marked for the driver, by the engagement of a spring pressed detent.

Although this invention has been described in its preferred form with a certain degree of particularity, it is understood that the present disclosure of the preferred form has been made by way of example only and that numerous changes in the details of construction may be resorted to without departing from the spirit and the scope of the invention as claimed.

I claim:

1. A shift control for compound change speed gear transmissions of the range type having a main transmission section and an auxiliary transmission section connected in series, said control comprising: a casing, a first and a second generally parallel shift rods each shiftable axially in the casing to select at least one gear ratio of the main transmission, a cross shaft mounted in said casing generally transversely of said shift rods for axial sliding movement to-and-fro in the direction of its longitudinal axis and for rotational movement in both directions about its longitudinal axis, a gear selector finger on the cross shaft and movable therewith, two pairs of selector finger engagement faces provided on each shift rod, the faces of each pair being spaced apart in the direction of axial shifting of the shift rods, the selector finger being displaceable in the direction of the longitudinal axis of the cross shaft for positioning between each pair of selector finger engagement faces and being pivotable about the axis of said cross shaft for selective engagement with one of said faces at a time of said pairs of faces to shift said shift rods, one pair of selector finger engagement faces on each shift rod disposed between the selector finger engagement faces on the other shift rod, and switch means operable in response to axial sliding of the cross shaft between one of its axial positions to engage said gear selector finger with one of said pairs of selector finger engagement faces on one shift rod and another axial position to engage said selector finger with one of said pairs of selector finger engagement faces on another shift rod, for shifting the auxiliary transmission, said pairs of selector finger engagement faces formed on first and second selector blocks mounted on the first and second parallel shift rods respectively, said pairs of faces defining a slot when all the shift rods are in their neutral positions in which slot the distal end of the selector finger is accomodated, the first and second selector blocks each formed with two slots intersecting at right angles, the slots extending parallel with the longitudinal axis of the cross shaft and the longitudinal axes of the shift rods respectively.

2. A shift control as defined in claim 1 wherein the first selector block has the form of a two-fingered claw the fingers of which extend into the longitudinally extending slot in the second selector block and are stepped at their distal ends, and the stepped finger ends interfit with the stepped castellations of the second selector block.

3. A shift control as claimed in claim 2 wherein the switch means comprises mechanically operable, spring biased, air valve means connected in a compressed air circuit to supply air under pressure to alternative sides of a servo piston and cylinder assemblage for shifting the auxiliary transmission between its high and low ranges, respectively.

4. A shift control as defined in claim 3 further comprising a formation on the cross shaft movable therewith to engage and overcome a spring biased detent mounted on said casing each time the cross shaft is slid axially in either direction to operate said switch means and a pair of resiliently yieldable abutments carried by the casing, one on each side of said detent, for positioning said formation in engagement with said detent when the formation is disposed between one of the abutments and the detent.

5. A shift control as defined in claim 1 wherein the cross shaft has an axial groove which aligns with a spring pressed, electrical switch operating detent carried by the casing in the neutral rotational position of the cross shaft and with the cross shaft in an axial position to select low range in the auxiliary transmission.

6. A shift control for compound change speed gear transmissions of the range type having a main transmission section and an auxiliary transmission section connected in series, said control comprising: a casing, a first, second and third generally parallel shift rods each shiftable axially in the casing to select at least one gear ratio of the main transmission, a cross shaft mounted in said casing generally transversely of said shift rods for axial sliding movement to-and-fro in the direction of its longitudinal axis and for rotational movement in both directions about its longitudinal axis, a gear selector finger on the cross shaft and movable therewith, pairs of selector finger engagement faces carried by the shift rods and engageable by the selector finger to shift the shift rods, there being at least two pairs of selector finger engagement faces carried by at least two of said shift rods which are spaced apart in the direction of axial sliding movement of the cross shaft with one pair of selector finger engagement faces on one shift rod disposed between the pairs of selector finger engagement faces on another of the shift rods, the faces of each pair of engagement faces being spaced apart in the direction of axial shifting of the shift rods, the selector finger being displaceable in the direction of the longitudinal axis of the cross shaft for positioning between each pair of selector finger engagement faces and being pivotable about the axis of said cross shaft for selective engagement with one of said faces at a time of said pairs of faces to shift said shift rods, said pairs of selector finger engagement faces being formed on first, second and third selector blocks mounted on the first, second and third parallel shift rods respectively, said pairs of faces defining a slot when all the shift rods are in their neutral positions in which slot the distal end of the selector finger is accommodated, the selector finger displaceable to-and-fro along said slot between end faces formed on the first and third selector blocks, said slot end faces limiting the axial movement of said cross shaft, the first and second selector blocks are each formed with two slots intersecting at right angles, the slots extending parallel with the longitudinal axis of the cross shaft and the longitudinal axes of the shift rods respectively, and switch means operable in response to axial sliding of the cross shaft between one of its axial positions to engage said gear selector finger with one of said pairs of selector finger engagement faces on one shift rod and another axial position to engage said selector finger with the other of said pairs of selector finger engagement faces on said one shift rod, for shifting the auxiliary transmission.

7. A shift control as defined in claim 6 wherein the first selector block has the form of a two-fingered claw the fingers of which extend into the longitudinally extending slot in the second selector block and are stepped at their distal ends, and the stepped finger ends interfit with stepped castellations of the second selector block.

8. A shift control as claimed in claim 6 wherein the switch means comprises mechanically operable, spring biased, air valve means connected in a compressed air circuit to supply air under pressure to alternative sides of a servo piston and cylinder assemblage for shifting the auxiliary transmission between its high and low ranges, respectively.

9. A shift control for compound change speed gear transmissions of the range type having a main transmission section and an auxiliary transmission section connected in series, said control comprising: a casing, a first, second and third generally parallel shift rods each shiftable axially in the casing to select at least one gear ratio of the main transmission, a cross shaft mounted in said casing generally transversely of said shift rods for axial sliding movement to-and-fro in the direction of its longitudinal axis and for rotational movement in both directions about its longitudinal axis, a gear selector finger on the cross shaft and movable therewith, two pairs of selector finger engagement faces provided on each shift rod, the faces of each pair being spaced apart in the direction of axial shifting of the shift rods, the selector finger being displaceable in the direction of the longitudinal axis of the cross shaft for positioning between each pair of selector finger engagement faces and being pivotable about the axis of said cross shaft for selective engagement with one of said faces at a time of said pairs of faces to shift said shift rods, one pair of selector finger engagement faces on each shift rod disposed between the selector finger engagement faces on the other shift rods, and switch means operable in response to axial sliding of the cross shaft between one of its axial positions to engage said gear selector finger with one of said pairs of selector finger engagement faces on one shift rod and another axial position to engage said selector finger with the other of said pairs of selector finger engagement faces on said one shift rod, for shifting the auxiliary transmission, said switch means comprising mechanically operable, spring biased, air valve means connected in a compressed air circuit to supply air under pressure to alternative sides of a servo piston and cylinder assemblage for shifting the auxiliary transmission between its high and low ranges, respectively, and a formation on the cross shaft movable therewith to engage and overcome a spring biased detent mounted on said casing each time the cross shaft is slid axially in either direction to operate said switch means and a pair of resiliently yieldable abutments carried by the casing, one on each side of said detent, for positioning said formation in engagement with said detent when the formation is disposed between one of the abutments and the detent.

10. A shift control as defined in claim 9 wherein said pairs of selector finger engagement faces are formed on first, second and third selector blocks mounted on the first, second and third shift rods respectively, said pairs of faces defining a slot when all the shift rods are in their neutral positions in which slot the distal end of the selector finger is accomodated.

11. A shift control as defined in claim 10 wherein the selector finger is displaceable to-and-fro along said slot between slot end faces formed on the first and third selector blocks, said slot end faces limiting the axial movement of said cross shaft.

12. A shift control as defined in claim 11 wherein the first and second selector blocks are each formed with two slots intersecting at right angles, the slots extending parallel with the longitudinal axis of the cross shaft and the longitudinal axes of the shift rods respectively.

13. A shift control as defined in claim 9 wherein the cross shaft has an axial groove which aligns with a spring pressed, electrical switch operating detent carried by the casing in the neutral rotational position of the cross shaft and with the cross shaft in an axial position to select low range in the auxiliary transmission.

14. A shift control as defined in claim 9 wherein the cross shaft carries a relay lever fixed thereto, said casing journals a selector shaft disposed transversely of said cross shaft, a trunnion is secured to the selector shaft, a double balled drop lever is suspended from said trunnion, the upper ball of the drop lever is located in a hole in the relay lever and the lower ball of the drop lever is located in a slot in said casing.

15. A shift control as defined in claim 14 wherein the casing comprises a housing for said relay lever, said selector shaft and said drop lever, said housing has a removable cover plate, and said slot is formed between the prongs of a fork mounted on the cover plate and supported at its opposite inner end in a hole in the housing.

16. A shift control as defined in claim 14 further comprising a formation on the cross shaft movable therewith to engage and overcome a spring urged detent mounted on said casing each time the cross shaft is slid axially in either direction to operate said switch means and a pair of resiliently yieldable abutments carried by the casing, one on each side of said detent, for positioning said formation in engagement with said detent when the formation is disposed between the abutment and the detent.

* * * * *